United States Patent [19]

Yamada et al.

[11] Patent Number: 4,746,928

[45] Date of Patent: May 24, 1988

[54] MICRO-DOT INK JET RECORDER

[75] Inventors: Takahiro Yamada, Ibaraki; Yasumasa Matsuda, Hitachi; Makoto Yoshino, Ebina; Masatoshi Sakata, Yokohama, all of Japan

[73] Assignees: Hitachi, Ltd.; Hitachi Koki, Co. Ltd., both of Tokyo, Japan

[21] Appl. No.: 902,561

[22] Filed: Sep. 2, 1986

[30] Foreign Application Priority Data

Sep. 6, 1985 [JP] Japan ............................... 60-195914

[51] Int. Cl.[4] ............................................. G01D 15/18

[52] U.S. Cl. ....................................................... 346/75

[58] Field of Search .................... 346/1.1, 75; 427/14.1

[56] References Cited

U.S. PATENT DOCUMENTS 4,068,241 1/1978 Yamada ................................ 346/75

4,381,342 4/1983 Van Heyningen .................. 430/496

4,542,385 9/1985 Tinnai et al. ......................... 346/75

*Primary Examiner*—E. A. Goldberg

*Assistant Examiner*—Gerald E. Preston

*Attorney, Agent, or Firm*—Antonelli, Terry & Wands

[57] ABSTRACT

An ink jet recorder in which ink droplets having different, large and small diameters are produced, only the small diameter ink droplets of the ink droplets are selectively charged and deflected to record dots on a recording medium. The property of the ink employed in the recorder is selected to meet the condition $K \leqq N^n \times T^m$ (N represents the viscosity of the ink, T represents the surface tension thereof, and n, m and K are positive constants, respectively), thereby maintaining the diameter of the small diameter ink droplets at a substantially constant value in the operation temperature range of the recorder.

5 Claims, 5 Drawing Sheets

FIG. 2

| EXCITATION VOLTAGE | MODE | SEPARATION SEQUENCE | INK COLUMN SHAPE & CHARGING STATE* WHEN DROPLETS ARE SEPARATED | |
|---|---|---|---|---|
| LOW | (A) | $\beta_0 \rightarrow \alpha_f \rightarrow \beta_b \rightarrow \alpha_0$ | 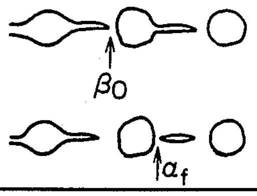  | EVERY INK DROPLETS ARE NOT CHARGED |
| ↑ | (B) | $\alpha_f, \beta_0 \rightarrow \alpha_0, \beta_b$ | 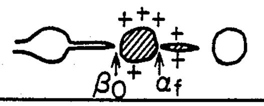  | BOTH LARGE AND SMALL DROPLETS ARE CHARGED |
| | (C) | $\alpha_f \rightarrow \beta_0 \rightarrow \alpha_0 \rightarrow \beta_b$ | 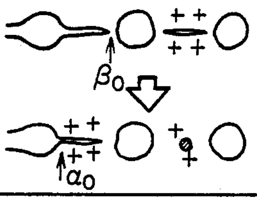  | ONLY SMALL DROPLET IS CHARGED |
| | (D) | $\alpha_0, \beta_b \rightarrow \alpha_b, \beta_b$ | 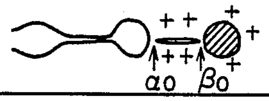  | BOTH LARGE AND SMALL DROPLETS ARE CHARGED |
| ↓ | (E) | $\alpha_f \rightarrow \beta_f \rightarrow \alpha_0 \rightarrow$ $\beta_0 \rightarrow \alpha_b \rightarrow \beta_b$ | 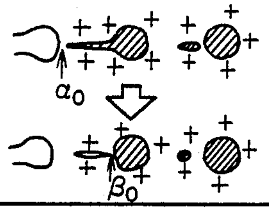  | BOTH LARGE AND SMALL DROPLETS ARE CHARGED |
| HIGH | (F) | $\alpha_f \rightarrow \alpha \rightarrow \alpha_b$ | 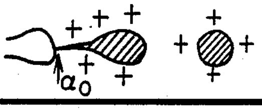  | NO SMALL DROPLET IS PRODUCED |

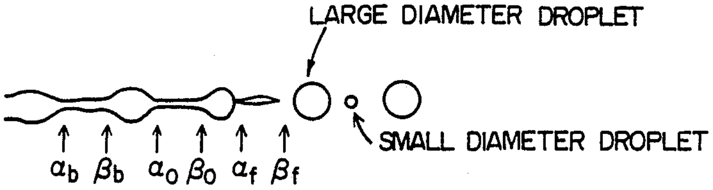

*NOTE: THIS IS SHOWN CHARGING STATE WHEN CHARGING VOLTAGE IS APPLIED ONLY AT THE SEPARATION OF $\alpha$ POINT

MICRO-DOT INK JET RECORDER

BACKGROUND OF THE INVENTION

This invention generally relates to an ink jet recorder of the charging deflection type in which after ink droplets emerging from a nozzle are charged, they are deflected in a predetermined direction by the application of electric field so as to form recording dots on a recording medium. More particularly, this invention relates to an improvement of the micro-dot ink jet recorder in which two kinds of ink droplets of large diameter and small diameter are alternately emitted from a nozzle and only the ink droplets of small diameter are used for recording.

In an ink jet recorder, ink droplets are emitted from a nozzle by applying a high frequency excitation voltage on a piezoelectric device mounted to the nozzle. The produced ink droplets are varied in their form by controlling the excitation voltage applied to the nozzle. For example, three forms of the ink droplets due to different excitation voltages are disclosed in U.S. Pat. No. 4,050,077 to Takahiro Yamada et al. assigned to the same assignee as this application.

For realizing a high quality image in the ink jet recorder, it is most important that the ink droplets have uniform diameters. Nevertheless, in actual practice, small diameter ink droplets will follow larger diameter normal ink droplets, which will degrade the recorded image quality. Therefore, in the prior art, the excitation voltage was controlled so as to not produce such small diameter ink droplets, and so the small droplets have not been used for recording in the ink jet recorder.

Yamada, who is one of the inventors of the present invention and others proposed to use, for recording, these small diameter ink droplets which conventionally have been avoided. This is because the small diameter ink droplets provide small dots, which permits the recording to be more precise and the gradation of the recorded image to be more minute. U.S. Pat. No. 4,050,077 mentioned above discloses a micro-dot ink jet recorder in which only small diameter ink droplets between the ink droplets of small diameter and large diameter are used for recording, i.e., only the small diameter ink droplets are selectively charged and deflected. Further, U.S. Pat. No. 4,408,211 to Yamada discloses a method for carrying out the charging and deflection of the small diameter ink droplet by means of a common electrode in a micro-dot ink jet recorder. The micro-dot ink jet recorder using small ink droplets is a remarkable invention in that the small ink droplets can be produced without reducing the diameter of the ink jet nozzle. Incidentally, a physical mechanism in which both large diameter ink droplets and small diameter ink droplets are emitted from the nozzle has not been clarified sufficiently as yet, but Yamada et al. experimentally found the condition of the excitation voltage for assuring the alternate production of both large and small diameter ink droplets with uniform diameters as shown in U.S. Pat. No. 4,050,077.

SUMMARY OF THE INVENTION

We have found that the micro-dot ink jet recorder gave rise to some problems causing color shear in printing, unstable dot diameters and sticking of the ink droplets onto the control electrodes thereby making it impossible to provide normal ink dots. As a result of this investigation, it was found that these problems result from the fact that the temperature increase inside the recorder in operation makes the diameter of the ink droplets even smaller than a predetermined diameter thereof; more specifically, when the diameter of the small ink droplets become finer than the predetermined value, they are undesirably deflected by the electric field so as to land at positions greatly displaced from the target positions on a recording medium, vary in their trajectory under the influence of the ambient air current and in an extreme case they are deposited on the control electrodes to produce a spark. The specifics of such problems will be explained in detail later.

We have carried out many experiments to solve the problems of the micro-dot ink jet recorder mentioned above. As a result, it was found that the small diameter ink droplets maintain their predetermined diameter under a certain condition of ink property, i.e. surface tension and viscosity even when the temperature is increased to the highest temperature at the operation state of the recorder, and therefore, the problems mentioned above can be solved by using an ink which meets the above condition in a micro-dot ink jet recorder.

An object of this invention is to provide a micro-dot ink jet recorder in which small diameter ink droplets employed for recording maintain their diameter at a substantially constant value in the normal operating temperature range of the recorder.

To attain this object, in accordance with this invention, there is provided a micro-dot ink jet recorder comprising nozzle means for emitting ink, driving means mounted on the nozzle means for providing mechanical displacement to the nozzle in response to an excitation voltage so as to alternately emit ink droplets of large diameter and small diameter from the nozzle, and electrode means for selectively charging only the small diameter ink droplets and deflecting them in a predetermined direction by the application of an electric field, in which the surface tension T of the ink and the viscosity N thereof are in the highest temperature state of the recorder in the following relation: $N^n \times T^m \geqq K$ (n, m=positive constant, K=constant), and K is set to such a value at the diameter of the small diameter droplets is not substantially changed at the above highest temperature.

The above and other objects, features and advantages of this invention will be more apparent from the following detailed description taken in conjunction with the accompanying drawings.

BRIEF DESCRIPTION OF THE DRAWINGS

FIG. 2 is a table showing the relations between an excitation voltage and the formation state of ink droplets;

DESCRIPTION OF THE PREFERRED EMBODIMENTS

Figure 1:
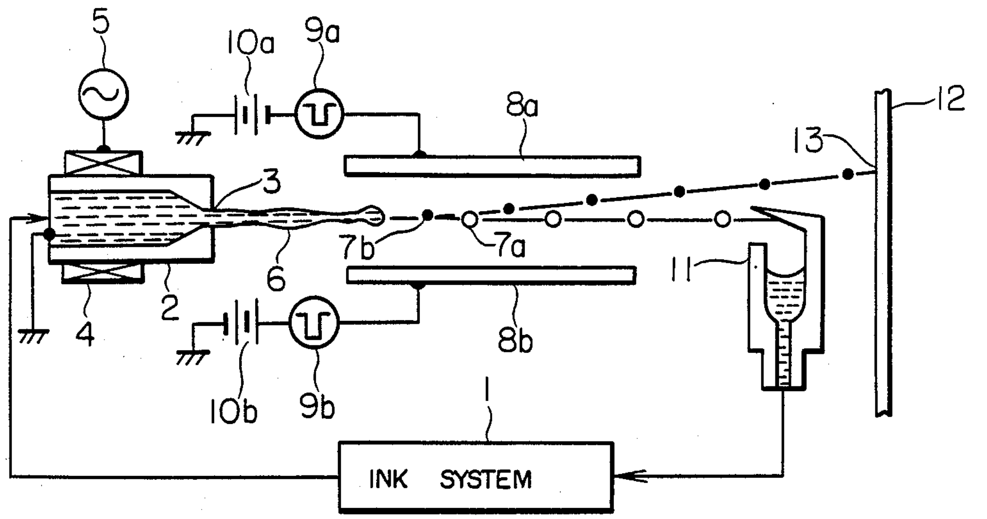
FIG. 1 is a schematic diagram of the micro-dot ink jet recorder according to this invention.

FIG. 1 shows a micro-dot ink jet recorder with charging electrodes and deflecting electrodes formed as common electrodes. Ink pressurized by an ink system 1 incorporating a pump is supplied to a nozzle 2 and emitted as an ink column 6 from a nozzle opening 3. A piezoelectric device 4 mounted on the nozzle 2 is excited by the voltage form a high frequency power supply 5 so as to vibrate the ink column 6. Thus, the ink column 6 is separated alternately into large diameter ink droplets 7*a* and small diameter ink droplets 7*b* from its tip. Control electrodes 8*a* and 8*b* are oppositely provided so as to cover the region where the ink column 6 is separated into the ink droplets 7*a* and 7*b*. These electrodes are supplied with recording signals (charging signals) from recording signal sources 9*a* and 9*b* and voltages from deflecting power sources 10*a* and 10*b* respectively so that the ink droplets are selectively charged in accordance with the recording signals and subsequently deflected by the electric field. The deflected ink droplets pass over a gutter 11 and reach a recording medium 12 to form dots 13. The ink droplets not used to form the recording pattern travel straight without being charged and are deflected, and collected by the gutter 11.

Figure 3:
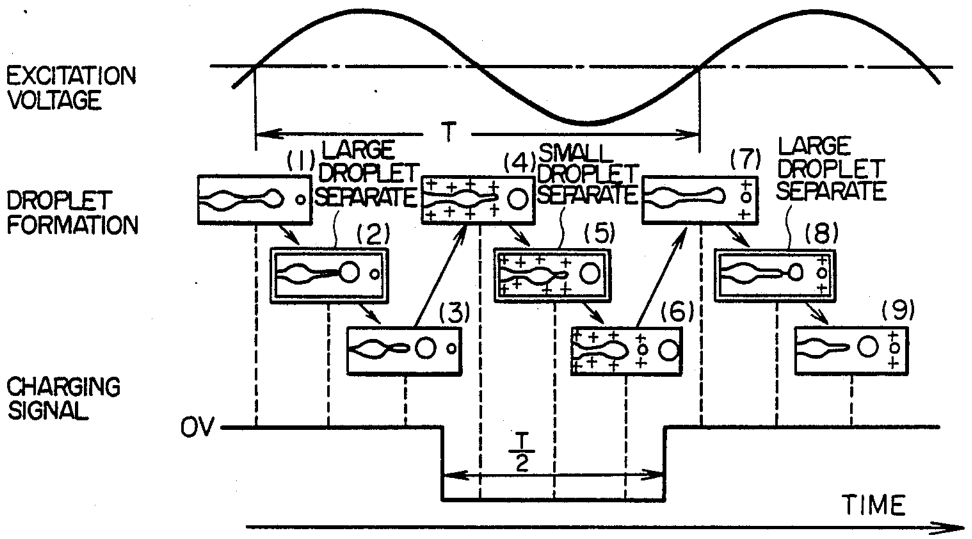
FIG. 3 is a timing chart of a charging signal with respect to the excitation voltage.

Now, the relations between excitation voltage and the shapes of the produced ink droplets will be explained on the basis of the experimental results shown in FIGS. 2 and 3. FIG. 2 shows the various ways in which the ink droplets are formed when the excitation voltage is changed and the charging states of the ink droplets thus formed (the charged droplets are indicated with + marks). Below FIG. 2 is a sketch of the ink column tip portion marked with Greek letters on the points where the ink droplets are separated. The ink droplets are charged at timings of the α points. As seen from FIG. 2, the separation sequence of mode C allows the charging of only the small diameter ink droplets, and so the excitation voltage in this case means an optimum excitation voltage. FIG. 3 shows the timing relations between the excitation voltage of a period T applied to the piezoelectric device 4 and the charging signals applied to the electrodes 8*a* and 8*b*, together with the states of the ink droplets formed with the elapse of time. As seen from FIG. 3, in mode C, the large diameter ink droplets and the small diameter ink droplets are separated from the ink column at constant time intervals. If the electrodes 8*a* and 8*b* are supplied with charging signal pulses with a pulse width of approx. T/2 at timings as shown in FIG. 3, the charging is performed when the small diameter ink droplets are separated from the ink column 6, but it is not performed when the large diameter ink droplets are separated. Therefore, only the small diameter ink droplets can be charged.

The operation of charging and deflection, which are performed by the common electrodes 8*a* and 8*b* shown in FIG. 1, will be explained below. These electrodes 8*a* and 8*b* are biased by D.C. voltages 10*a* and 10*b* with opposite polarities, respectively so that an electric field with the electrode 8*b* at a positive potential is generated between the electrodes 8*a* and 8*b*. The ink is placed at a ground potential. Therefore, if the ink column 6 is placed at a central position between the electrodes 8*a* and 8*b*, it is also placed at a ground potential without being charged by the bias voltage. However, if the electrodes 8*a* and 8*b* are supplied with the charging signals 9*a* and 9*b* with the same phase, the ink droplets are charged with the charging amount corresponding to the amplitude of the charging signals. Since they are deflected by the electric field between the electrodes 8*a* and 8*b* at the same time as the charging, they fly in a predetermined direction. In this way, if the ink droplets are generated with the optimum excitation voltage and the charging signal applied at the timings as shown in FIG. 3, only the small uniform diameter ink droplets can be adopted for recording.

Figure 4:
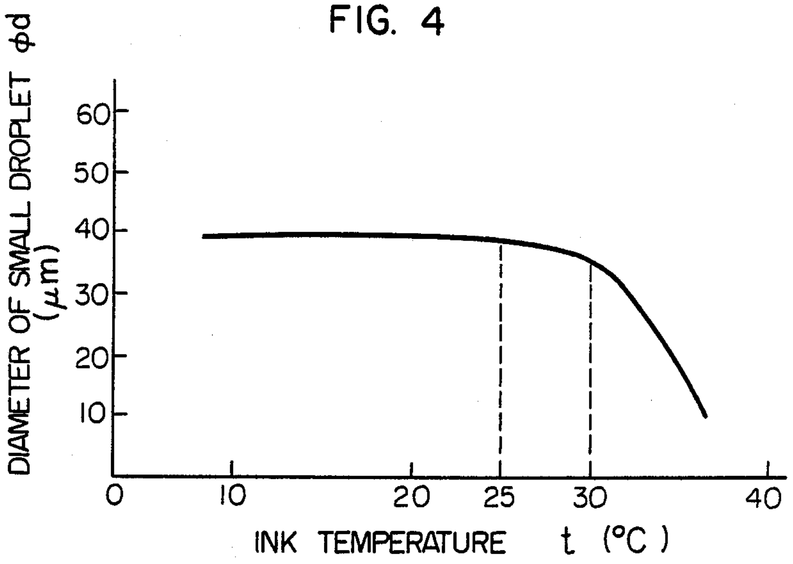
FIG. 4 is a graph showing the relation between the diameter of small ink droplets and ink temperature.
Figure 5:
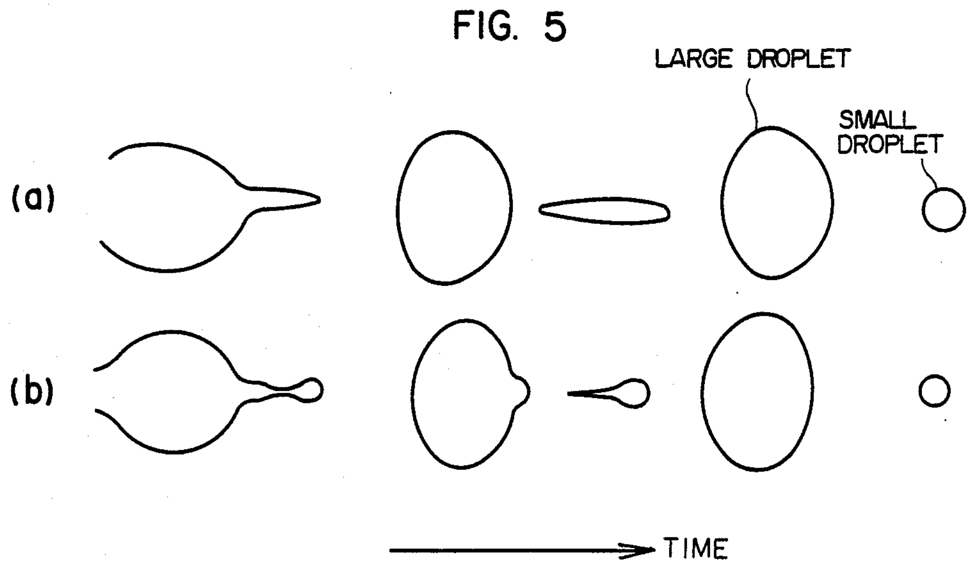
FIG. 5 is an expanded view showing the process at the instant when the small diameter ink droplet is produced in two cases.

However, it has been confirmed by experiments that if the ink temperature is increased with the operation temperature of the recorder, the small and uniform diameter ink droplets will not be produced. FIG. 4 shows one example of the temperature characteristics of the diameter of the small ink droplet diameter in the conventional ink. The abscissa represents the operation temperature, of the recorder, i.e. the ink temperature while the ordinate represents the diameter $\phi d$ of the small diameter ink droplets. As seen from FIG. 4, when the ink temperature exceeds 25° C., the diameter $\phi d$ starts to become small, and when the ink temperature exceeds 30° C., that diameter abruptly becomes small. Thus, particularly when the ink temperature exceeds 30° C., the color reproduction will greatly deteriorate because of increased deflection of the ink droplets, the recording dot diameter will become unreasonably small, the record will be confused because of unstabilized flying of the ink droplets, and the fine ink droplets will stick to the control electrodes to make the recording impossible. FIGS. 5(*a*) and (*b*) illustrate the time-sequential manner in which the small diameter ink droplets are formed at room temperature (20° C.) and at a higher temperature (30° C.), respectively. As seen from the figure, in the case of room temperature (FIG. 5(*a*)), the small diameter droplet will be sharply separated from the large diameter droplet, whereas in the case of a higher temperature (FIG. 5(*b*)), a part of the small diameter droplet is absorbed into the large diameter droplet in the separation process, resulting in a smaller diameter droplet than in the case of room temperature.

Figure 6:
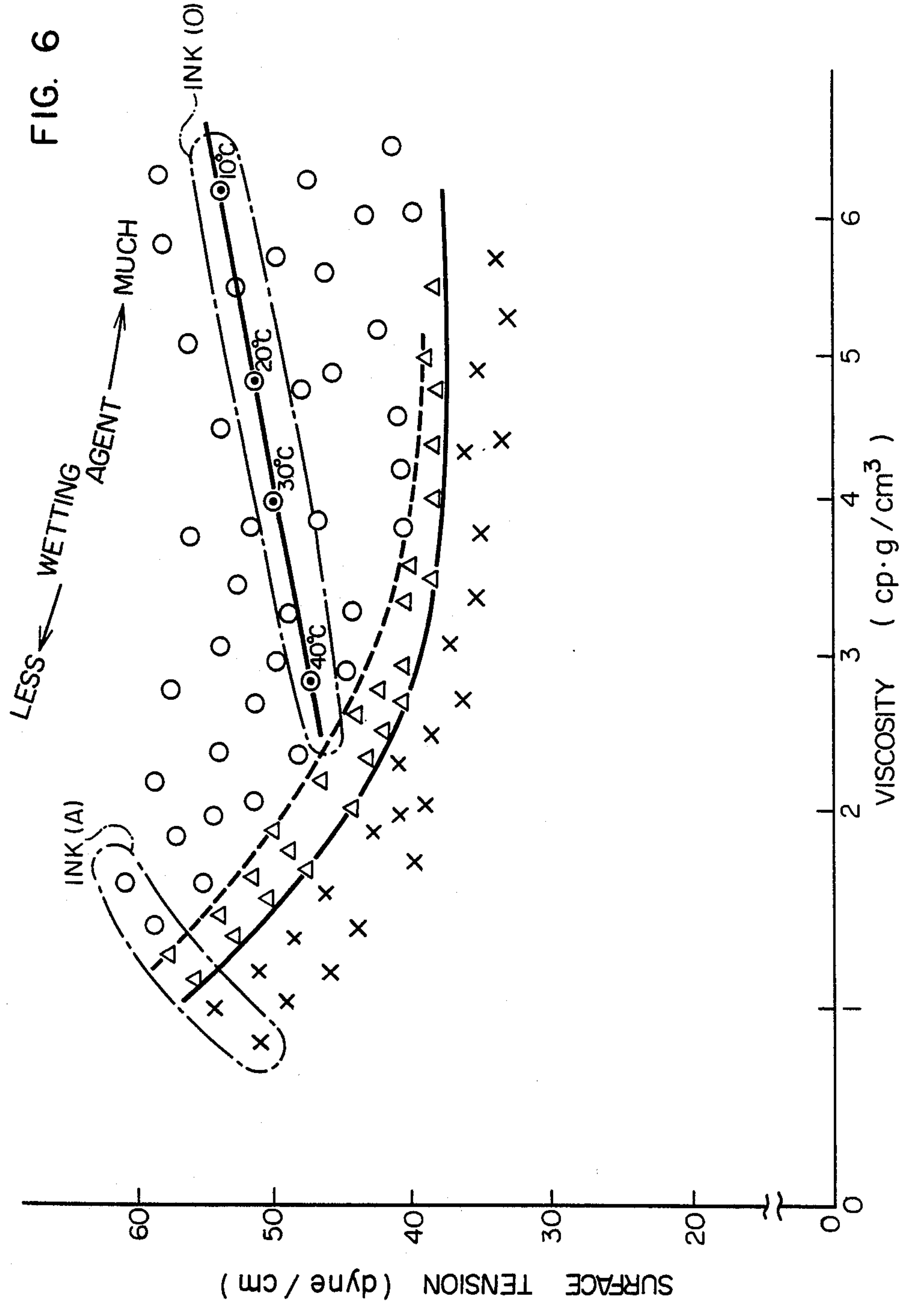
FIG. 6 is a graph showing the relation of the viscosities of several kinds of ink vs. the surface intension.

In order to solve the above problem caused by the increase of the ink temperature, we have carried out the experiments as shown in FIG. 6. FIG. 6 illustrates the states of the small diameter ink droplets formed when the ink temperature is changed for several kinds of ink with different surface tensions and viscosities, which are main ink properties changed with temperature. The ink viscosity is gradually increased from ink (A) toward ink (O), which can be performed by increasing the concentration of the wetting agent, e.g. polyethylene glycol or ethylene glycol, contained in the ink. The surface tension and viscosity of the ink as well as the diameter of the small diameter ink droplets were measured changing the ink temperature in the range of 10° C.–40° C. The measurement result is that the ink (A), for example, provides at 10° C. a surface tension of approximately 61 dyne/cm$^2$ and a viscosity of 1.6 cp.g/cm$^3$, but when the ink temperature is increased, the ink (A) provides a surface tension and viscosity both reduced in the direction to the left and bottom in the graph of FIG. 6. In the graph, the points indicated with circle marks ○ are characteristic points where the diameter of the small diameter ink droplets is at a predetermined value to permit the normal dots to be recorded. The points indicated with triangle marks Δ are characteristic points where that diameter becomes slightly small, but the recorded dots don't provide any problem in practical use. The points indicated with cross marks X are characteristic points where that diameter abruptly becomes small to make it impossible to record the normal dots. The ink (A) provides an abnormality when the ink temperature exceeds 30° C. The cross mark points correspond to the temperature range exceeding 30° C. in the graph of FIG. 4. When the ink viscosity is increased by increasing the concentration of the wetting agent in the ink, the ink surface tension inversely tends to be reduced.

These data indicate that the boundary between the normal mark points ○ and the triangle mark points Δ and the boundary between the triangle mark points Δ and the abnormal mark points X roughly draw curves as shown by a broken line and a solid line in the graph of FIG. 6, respectively. Namely, when the surface tension and viscosity are present above the broken line, the diameter of the small diameter ink droplets is maintained at a predetermined value, thereby permitting the normal dots to be recorded. When they are present between the broken line and the solid line, that diameter is reduced to the value of approx. 90% of the predetermined value, but it is possible to record the dots so that no problem occurs in practical use.

Assuming that the ink viscosity is N, and the ink surface tension is T, the approximate equation of the curve represented by the solid line is $$N^n \times T^m = K$$

where n, m and K are positive constants. The curve represented by this equation is a boundary between conditions where the small diameter ink droplets having a substantially constant diameter are or are not formed, and this boundary is referred to as a stable formation boundary of the small diameter ink droplets.

In order to record the normal dots, the condition $N^n \times T^m \geqq K$ must be satsified. Namely, the values of the viscosity and the surface tension of the ink must be present in the region over the solid line curve of FIG. 6. FIG. 6 shows that some inks provide the surface tension and viscosity within the stable formation boundary of the smaller ink droplets at 40° C., which is the highest temperature of the ink jet recorder. One example thereof is an ink (O).

Figure 7:
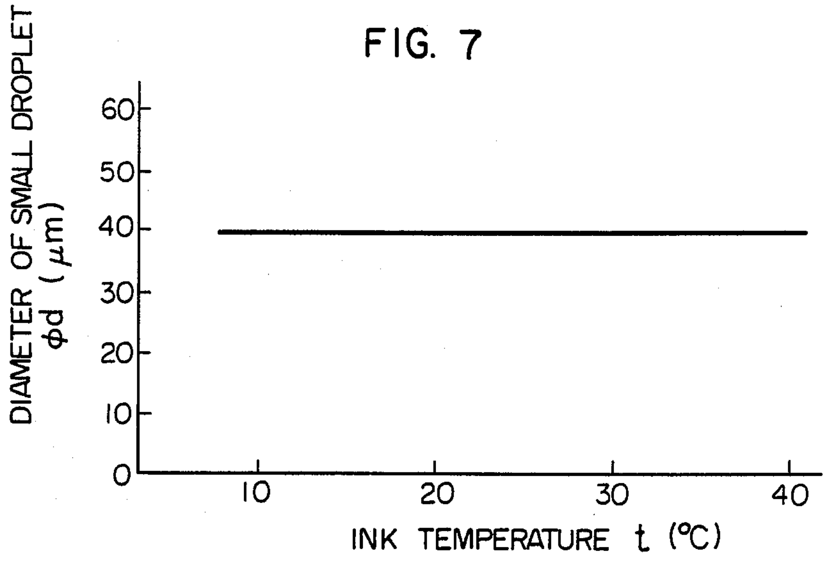
FIG. 7 is a graph showing the relation between the diameter of the small diameter ink droplet and ink temperature in the ink according to one embodiment of this invention.

FIG. 7 shows a characteristic of the temperature vs. the diameter of the smaller diameter ink droplets in the ink (O). As seen from the figure, that diameter is maintained constant in the temperature range of 10° C.-40° C. This characteristic of the ink (O) is apparently different from that of the conventional ink as shown in FIG. 4. The conventional ink has a viscosity set at 1.7-2 (cp.g/cm$^3$) at 25° C., containing a wetting agent of approx. 10%. The setting of such an extent of the viscosity is because raising the viscosity too much in the conventional recorder will increase the pressure loss at the nozzle to reduce the jetting speed of the droplets. On the other hand, the ink employed in the micro-dot ink jet recorder of this invention preferably contains a wetting agent of approx. 30-50% and a viscosity of approx. 4 (cp.g/cm$^3$) at 25° C. These values are not limitative as long as the viscosity and surface tension are present in the region over the stable formation boundary of the small ink droplets. In the case of an oily ink, its viscosity can be increased by increasing the content of resin, e.g. acryle resin. The pressure loss at the nozzle caused by the viscosity increase can be compensated for by enhancing the ink transmission pressure in the ink system.

In the case where the ink jet recorder emits ink at a speed of 40 m/sec from a nozzle having a diameter of approx. 65 μm, and produces ink droplets by exciting the piezoelectric device at a frequency of approx. 138 kHz, $n \approx 1$, $m \approx 3$ and $K \approx 1.7 \times 10^5$ apply to the equation representative of the stable formation boundary of small diameter ink droplets. In the case that the nozzle diameter is increased, the value of K correspondingly increases, and in the case that the nozzle diameter is decreased. the value K correspondingly decreases. For example where the nozzle diameter is 70 μm and 60 μm, $K \approx 1.9 \times 10^5$ and $K \approx 1.5 \times 10^5$, respectively. In each cases, mere slight changes arise in the values of n and m. On the other hand, when the excitation frequency applied to the piezoelectric device is set to be higher or the diameter of the small droplet is set to increase, the emitting speed of the ink droplet should be made higher. However, the values of n and m change slightly.

Figure 8:
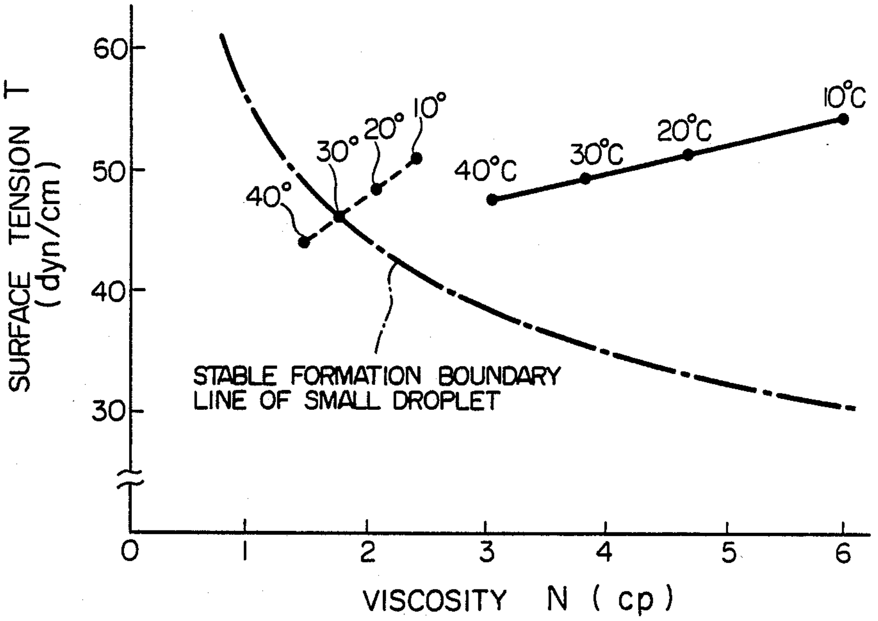
FIG. 8 is a graph showing the relation between the surface tension and viscosity using the temperature as a parameter in the ink employed in one embodiment of this invention.

In FIG. 8, the chain line represents the stable formation boundary of small ink droplets, and the solid line and the broken line represent the states of the ink droplets i.e. dots when the temperature of the inventive ink and the conventional ink are changed from 10° C. to 40° C. in the ink jet recorder, respectively. As seen from the figure, the conventional ink gives rise to poor dots at 30° C. while the inventive ink provides normal dots even at 40° C.

We claim:

1. An ink jet recorder for recording information on a recording medium using ink dots comprising:
   - means for emitting ink alternately in the form of ink droplets having large and small diameters, said ink droplets of small diameter having a predetermined diameter; and
   - electrode means for selectively charging only said small diameter ink droplets of said ink droplets and deflecting them toward said recording medium in a predetermined direction, wherein said ink has a property meeting the requirement $$K \leqq N^n \times T^m$$

where T represents the surface tension of the ink, N represents the viscosity thereof, and n, m, and K are positive constants, and K is set to such a value that the diameter of the small diameter droplets is substantially maintained at said predetermined diameter at the highest operation temperature of said recorder.

2. An ink jet recorder according to claim 1, wherein said K is set to such a value that the diameter of the small diameter droplets is maintained at 90% or more of said predetermined diameter at the highest operation temperature of said recorder.

3. An ink jet recorder according to claim 1, wherein said ink emitting means includes nozzle means, excited by a high frequency signal, for emitting ink as ink droplets, and when the diameter of said nozzle is in a range of 60-70 μm, said constants are determined such that $n \approx 1$, $m \approx 3$, and $K \approx 1.5 \times 10^5 - 1.9 \times 10^5$.

4. An ink jet recorder according to claim 3, wherein said ink is an aqueous ink containing a wetting agent of 30-50%.

5. An ink jet recorder according to claim 3, wherein said ink has a viscosity N of approximately 4 (cp.g/cm$^3$) at 25° C.

* * * * *